Figure 1:
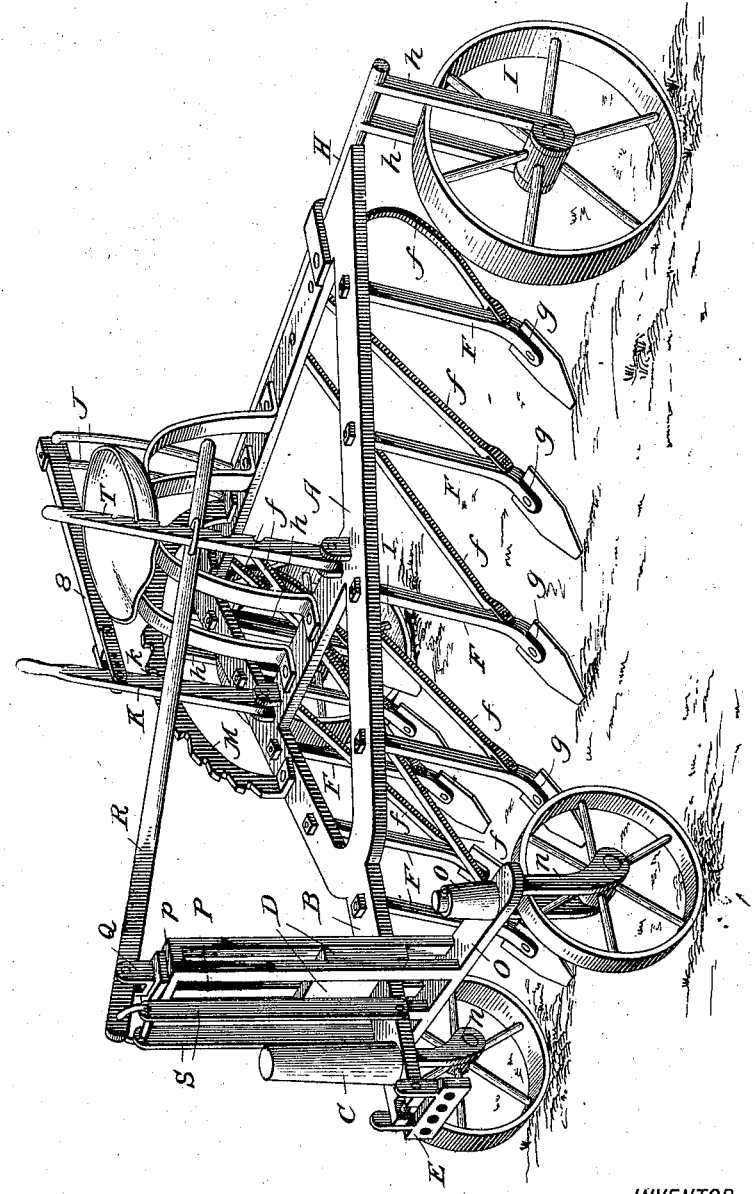

(No Model.) 2 Sheets—Sheet 1.

K. GUPTON.
PLOW.

No. 551,958. Patented Dec. 24, 1895.

WITNESSES:
Edwin L. Bradford
Ralph Wormelle

INVENTOR
Kindred Gupton
BY
Patrick O'Danell
ATTORNEYS

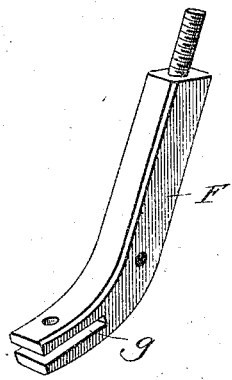
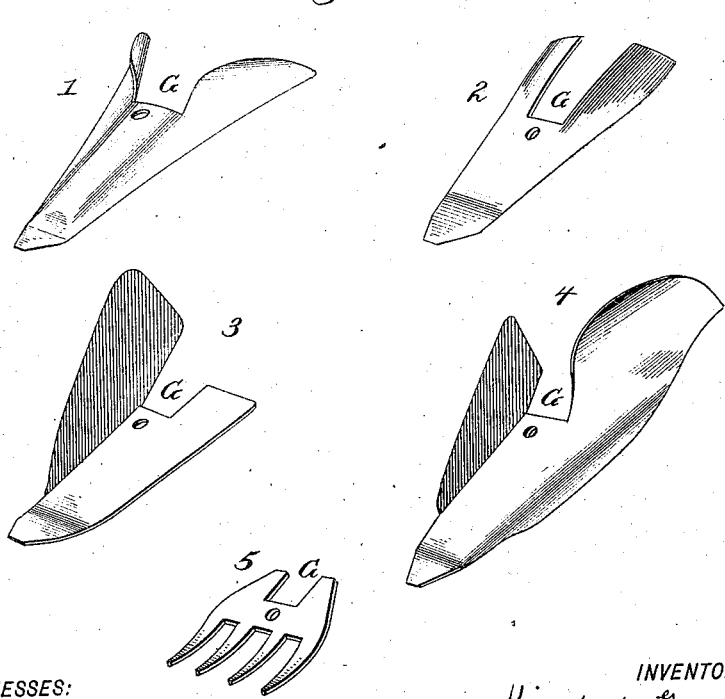

UNITED STATES PATENT OFFICE.

KINDRED GUPTON, OF SAN ANTONIO, TEXAS.

PLOW.

SPECIFICATION forming part of Letters Patent No. 551,958, dated December 24, 1895.

Application filed December 26, 1894. Serial No. 532,919. (No model.)

*To all whom it may concern:*

Be it known that I, KINDRED GUPTON, a citizen of the United States of America, residing at San Antonio, in the county of Bexar and State of Texas, have invented certain new and useful Improvements in Plows, of which the following is a specification, reference being had therein to the accompanying drawings.

This invention relates to sulky-plows, and aims to provide an agricultural implement having front and rear ground-wheels which are independently adjustable vertically to regulate the depth to which the plowing can be effected, and which will have their standards constructed to receive shovels, teeth, and earth-treating devices of various forms.

The improvement will be more fully set forth hereinafter and claimed, and is illustrated in the accompanying drawings, in which—

Figure 1 is a perspective view of a sulky-plow embodying the essential principles of the invention. Fig. 2 is a detail view of one of the standards having a slot in its lower curved end to interchangeably receive the various forms of shovels and earth-treating devices. Fig. 3 is a group of some of the forms of shovels, teeth, or earth-treating devices which are designed to be interchangeably attached to the lower end of any of the standards.

The frame A of the device is substantially A or triangular shaped and has a forwardly shaped extending bar B, from which rises a tubular post C and a guide-lug D. The clevis E is pivotally connected to the front end of the bar B and is adapted to have the draft adjustably applied thereto. Standards F are attached to the side bars of the frame and are strengthened by braces *f*. The lower ends of these standards curve forward and have a slot *g*, in which is fitted and secured one of the various forms and shapes of shovels and teeth shown in Fig. 3. The rear edges of the shovels have a notch G, forming side extensions, which project on each side of the standard to brace the shovel against lateral stress, so that a single bolt suffices to secure the shovel to the standard.

In Fig. 3, 1 represents a double-turn plow; 2, a scraper; 3, a sod-cutter; 4, a single-turn plow and colter combined, and 5 a rake or harrow tooth. Any one of these devices can be interchangeably attached to a standard to meet the requirements of the character of the work to be performed. A shaft or brace H is journaled in the rear of the frame in bearings 7 and has parallel arms *h* projecting at right angles therefrom, in the lower ends of which are journaled ground-wheels I. An upwardly-extended arm J is attached by link 8 to lever K, by means of which the shaft H is turned in its bearings to raise or lower the ground-wheel I to regulate the depth of the plowing. A pawl *k*, carried by the lever K, engages with one of a series of notches in the segment M, so as to hold the said lever K in the located position. The front ground-wheels N are mounted in frames *n*, which are journaled in sockets *p* at the ends of a cross-bar O. By this arrangement the ground-wheels adapt themselves to the direction of the draft. Two slotted standards P project vertically from the cross-bar O, and are connected at their upper ends by a cap-piece *p*, which is centrally apertured to receive the shank of a bearing Q, to which is pivoted a lever R. These standards P are disposed in parallel relation, one on each side of the bar B. The ends of the lug D extend into the slots of the standards P and guide them in their vertical movements. Links S connect the forward ends of the lever R with the forward portion of the bar B. A pivoted bar T, located near the driver's seat, has notches to receive a portion of a keeper on the end of the said lever to hold the latter in the desired position. The head U has a stem or pin by means of which it is pivotally connected with the tubular post C. An arm V is pivoted to the head U.

By raising and lowering either or both sets of ground-wheels the shovels can be regulated to plow deep or shallow as required.

I claim—

1. In a sulky plow the combination of a frame having a forwardly extending bar B, provided with a vertically disposed lug D, whose ends project beyond the edges of the bar B, a cross bar O, having ground wheels and vertically arranged slotted standards P, occurring on opposite sides of the bar B, and receiving the projecting end portions of the lug D, a lever mounted upon the connected ends of the slotted standards, and links connecting the lever with the bar B, substantially as described.

2. The herein specified sulky plow comprising an A-shaped frame having a forwardly extending bar B, provided with a vertical lug D, whose ends project beyond the edges of the bar B, a seat mounted upon a cross bar of the frame, a shaft journaled to the rear of the frame and having pendent hangers provided with ground wheels and an upwardly extending arm, a lever K, mounted upon the cross bar of the frame and to one side of the seat and having connections with the upwardly extending arm of the shaft, a cross head having ground wheels and upwardly extending slotted standards P, occurring on opposite sides of the bar B, and receiving the ends of the lug D, a lever R, mounted upon the upper ends of the standards P, links connecting the levers with the bar B, and a notched bar T, pivoted to the cross bar of the frame on the opposite side of the seat to the lever K, and adapted to hold the lever R, in the required position, substantially as specified.

In testimony whereof I affix my signature in presence of two witnesses.

KINDRED GUPTON.

Witnesses:
J. M. ECKFORD,
D. M. POOR.